UNITED STATES PATENT OFFICE.

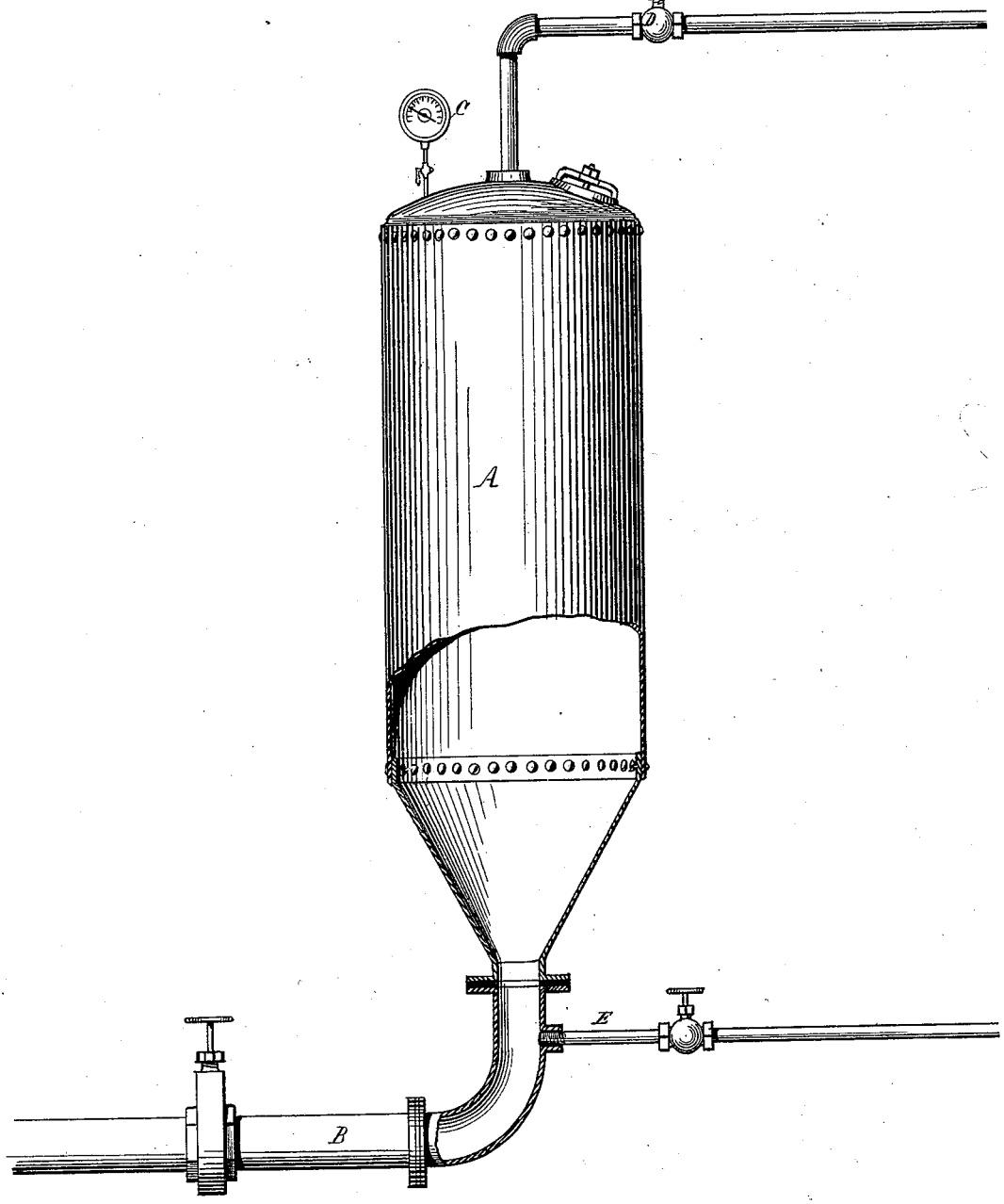

JAMES W. GAFF, OF CINCINNATI, OHIO.

IMPROVEMENT IN PROCESSES OF REDUCING VEGETABLE SUBSTANCES TO PREPARE THE SAME FOR SACCHARIFICATION.

Specification forming part of Letters Patent No. 202,016, dated April 2, 1878; application filed March 6, 1878.

*To all whom it may concern:*

Be it known that I, JAMES W. GAFF, of Cincinnati, in the county of Hamilton and State of Ohio, have invented a new and useful Improvement in the Art of Reducing Vegetable Substances to Prepare the Same for Saccharification, of which the following is a full, clear, and exact description.

This invention relates to a process of reducing vegetable substances, such as corn, grain, potatoes, &c., by free steam under pressure.

In practicing this process in the known way—namely, by holding the mass to be reduced, as well as the steam, in close confinement in a tight vessel—a large proportion of each charge remains in an imperfectly-reduced condition. This is owing to the fact that, by reason of the close confinement of the steam soon after its admission, an equilibrium of pressure obtains in the vessel, which causes a cessation of active ebullition and the settling of the mass in an inert condition, preventing that thorough and equal diffusion of the steam which is of the first importance to the uniform reduction of the mass.

The object of my invention is to so modify the above-mentioned steaming process that the mass to be reduced shall be kept throughout the process in active ebullition and agitation by the steam, to provide for the thorough diffusion of the latter, so that all the particles may be equally affected thereby, and a uniform temperature maintained throughout the whole mass.

To this end my invention consists in subjecting such vegetable substances to a current or currents of steam under pressure, so that the agitating action of the flowing steam, by aiding its thorough diffusion, will bring its solvent properties to bear alike upon all parts of the mass, and also have a certain mechanical effect thereon to hasten the reduction and make it more perfect.

My improved process may be practiced by means of a tight vessel which has an escape-valve at the top for the constant or intermittent escape of steam, or is connected or provided with means for constantly condensing a small quantity of steam at the top of the mass, the result in either case being the maintenance of a current of steam through the mass, and the consequent active ebullition and agitation of the same.

In the annexed drawing I have shown one form of apparatus with which my improved process may be practiced. It will be understood, however, that other and different means may be employed to practice my process; and that I do not confine myself to the use of any particular kind of apparatus.

The apparatus shown consists of an upright boiler, A, with a tapering bottom, to a neck of which a discharge-pipe, B, governed by a suitable valve or gate, is secured. Steam enters also at the bottom through a pipe, E. The top of the boiler is provided with a man-hole, or other suitable covered opening, for the introduction of the materials to be reduced. It also has a gage, C, to indicate the pressure at the top of the boiler, and a globe or other valve, D, through which the steam is permitted to escape in sufficient quantities for the maintenance of a current of the steam from bottom to top through the mass.

Steam may be admitted at several points around the bottom of the boiler. Some means, such as an ordinary trap, may also be used at the top of the boiler, to prevent the escaping steam from carrying off any portion of the mass under treatment.

The operation is as follows: The substance to be boiled is introduced through the man-hole in the top of the boiler and mixed with water or other solvent, so as to fill the tank, preferably, to the extent of about three-quarters of its capacity. The water used may be either hot or cold, and may be obtained by the condensation of the steam first entering. It is preferable to use water enough to cover the vegetable substance to be reduced. The man-hole having been tightly closed, steam is introduced through pipe E, the escape-valve being either left open from the beginning, or kept closed for a time until the desired pressure obtains in the boiler, at which time the valve should be opened to effect a motion of the steam through the mass, in consequence of which an active ebullition and continuous agitation will be maintained. After the mass has been boiled in this way a sufficient length of time, which is determined by the nature of the substance under treatment and the pressure of the steam, it is blown out of the boiler through the discharge-pipe B, and conducted either directly to the mashing-tub or first through a grinding, crushing, or beating machine. Subsequently it is saccharified and fermented.

I do not claim subjecting vegetable substances to a current or currents of free steam under pressure at any stage in the process of saccharifying them.

What I claim as my invention, and desire to secure by Letters Patent, is—

The process of reducing crude vegetable substances, to prepare the same for saccharification, by subjecting them to the agitating and solvent action of a current or currents of free steam under pressure.

In testimony whereof I have signed my name to the foregoing specification in the presence of two subscribing witnesses.

J. W. GAFF.

Witnesses:
B. E. J. EILS,
E. R. REILLEY.